UNITED STATES PATENT OFFICE.

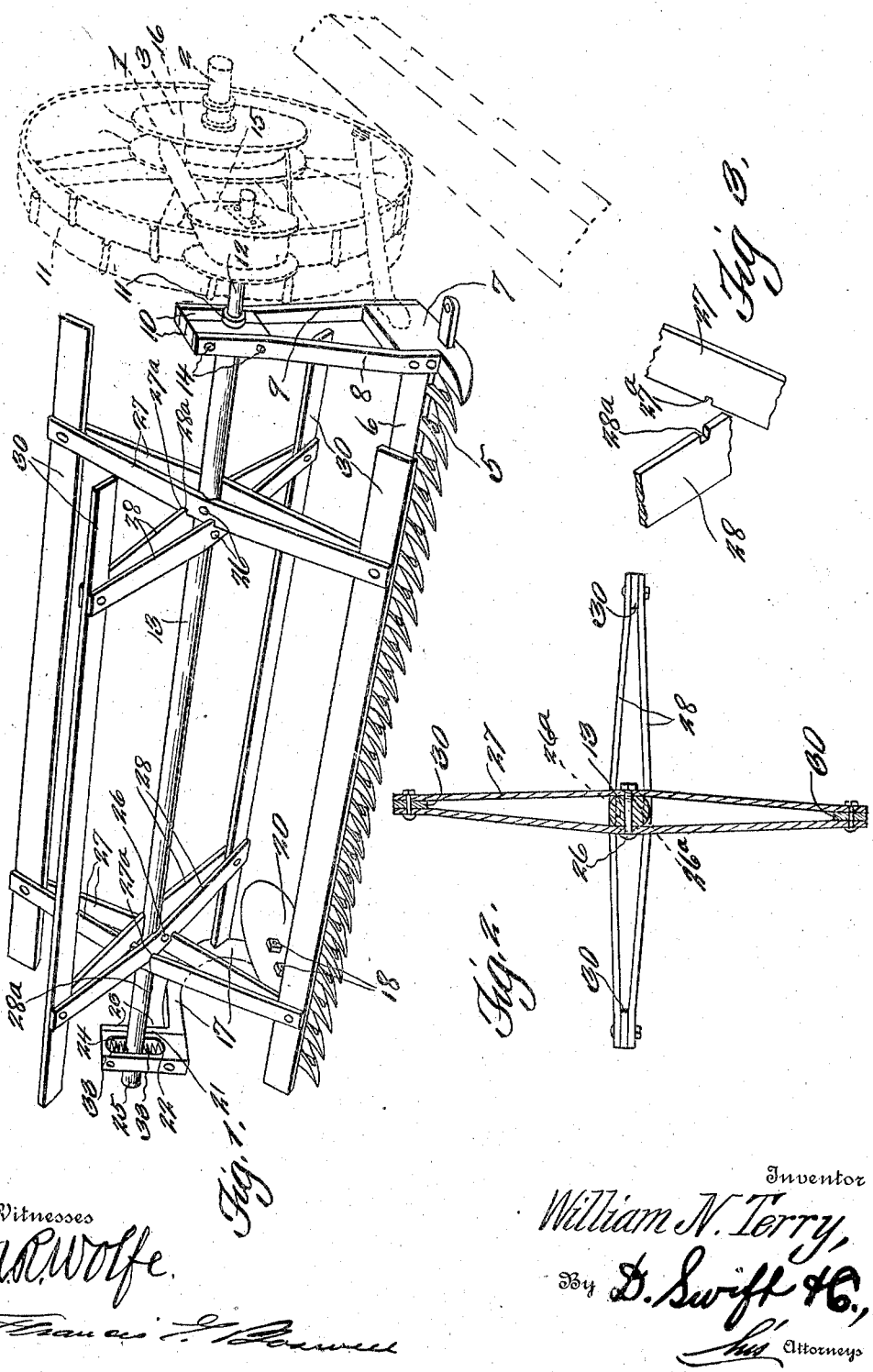

WILLIAM N. TERRY, OF PIERRE, SOUTH DAKOTA.

HARVESTER-REEL.

1,290,407.  Specification of Letters Patent.  Patented Jan. 7, 1919.

Application filed January 2, 1914, Serial No. 809,977. Renewed August 7, 1918. Serial No. 248,802.

*To all whom it may concern:*

Be it known that I, WILLIAM N. TERRY, a citizen of the United States, residing at Pierre, in the county of Hughes and State of South Dakota, have invented a new and useful Harvester-Reel; and I do hereby declare the following to be a full, clear, and exact description of the invention, such as will enable others skilled in the art to which it appertains to make and use the same.

This invention relates to a new and useful reel and support therefor for mowing machines.

An object of the invention is the provision of improved reel supported upon the guide bar of the sickle bar, so that when the guide bar with the sickle bar therein is raised and lowered, the reel, which is supported thereon, will raise and lower therewith.

One of the features of the invention is the mounting of the reel shaft at its outer end in a slot of a member of a curved arm, which is connected to the shoe at the outer end of the guide bar.

Another feature of the invention is the provision of improved radial arms, each of which comprises two strips fastened on opposite sides of the reel shaft, said strips being bowed as shown, between the opposite ends of which strips the reel blades are secured.

In practical fields the details may be subjected to alterations, falling within the scope of what is claimed.

The invention comprises further features and combination of parts, as hereinafter set forth, shown in the drawings and claimed.

In the drawings:—

Figure 1 is a view in perspective, showing a portion of a mowing machine in dotted lines, illustrating the reel as supported by the guide bar of the sickle bar.

Fig. 2 is a cross sectional view through the reel.

Fig. 3 is a detail view of two of the strips 27 and 28, showing the coöperating notches 27ª and 28ª.

Referring more particularly to the drawings, 1 designates a portion of a mowing machine, on the shaft 2 of which a pulley 3 is loosely mounted, which may be thrown in and out of gear with the shaft 2 by any suitable clutching means (not shown). Also on the shaft 2 is the usual form of traction wheel 4. The usual form of sickle bar 5 is provided, to be operated in the usual reciprocating manner, in the ordinary way (not shown). The sickle bar is mounted in the usual form of guide bar 6, which may be also raised and lowered, as the case may demand, by any suitable conventional mechanism (not shown).

Secured to the shoe 7 of the guide bar at its inner end are the substantially vertical upright standards 8 and 9 having the blocks or enlargements 10, in the opposite adjacent faces of which a bushing 11 is arranged, and in this bushing one end 12 of the reel shaft 13 is loosely mounted. The enlargements or blocks 10 and the upper end of the upright standard are bolted or otherwise secured together as shown at 14. On the extreme inner end of the reel shaft a pulley 15 is mounted to rotate therewith. Passing about the pulley 15 and pulley 3 is a belt 16, whereby motion may be imparted to the reel shaft.

An arm, curved in contour as shown, is secured at 18 to the shoe 20 at the outer end of the guide bar 6. This arm 17 is constructed with an angular end 21 secured to the block or member 22 as shown at 23. In a slot 24 of the block or member 22 the outer end 25 of the reel shaft 13 is loosely mounted, so that the free end of the shaft may yield vertically responsive to the amount of grain cut by the sickle bar.

Secured to the opposite sides of the reel shaft as at 26 are the strips 27 and 28. The strips 27 cross or are arranged at right angles to the strips 28, as shown. Secured between the outer ends of said strips 27 and 28 are blades 30. As shown these strips are bowed, so as to counteract the bending of the same. In other words the bowing of one strip will prevent the bending of the opposite strip and vice versa. These strips constitute the radial arms of the reel.

Springs 33 are arranged in the slot 24 of the block or member 22, one above and one below the reel shaft 13. As the reel revolves, the blades strike the stalks of the wheat or other crop, so that the stalks will fall upon a conveyer not shown, of the harvester, and as one blade of the reel abuts the guide bar with the stalks between the blade and the guide bar, the reel shaft is tilted upwardly against the action of the uppermost spring 33, the tension of which will throw the reel shaft slightly downwardly by the time the next blade is approaching the guide bar, in which case, the lower spring 33 will relieve the jar of the next blade, and which lower spring will in turn slightly oscillate the reel shaft upwardly again. Said springs alternate in their actions as the reel revolves.

Where the strips 27 and 28 engage the reel shaft, the shaft is provided with flat faces 26ª. The flat faces 26ª with which the strips 27 engage are arranged opposite one another, and at right angles to the flat faces with which the strips 28ª engage.

The strips 27 and 28 are provided with notches 27ª and 28ª which engage, so as to hold the strips more secure, in other words, lock them in position. These notches 27ª and 28ª are designed to materially relieve the strain, which is finally exerted upon the rivets or bolts 26, incident to the batting strips 30 coming in contact with the upstanding wheat or other crop. As the reel revolves, there is a pulling strain upon one end and then the other of one or the other of the strips 27 and 28, and a pushing strain upon the corresponding opposing strip, which tends to be transferred to the rivet or bolt. Therefore owing to the registering interlocking notch connections 27ª and 28ª, this pull and push strain is considerably absorbed or relieved, owing to the fact that each set of strips is acting against the strips at right angles thereto. Furthermore, under severe weather conditions, the holes of the strips 27 and 28, through which the rivets or bolts 26 extend will become large very quickly, hence the connections between the shaft 13 and the strips will become loose very rapidly, incident to this pull and push strain upon the rivets or bolts 26, hence, by the provision of said registering interlocking notch connections, the life of the reel may be considerably prolonged. In other words, by the provision of said registering interlocking notch connections, this looseness of play will be greatly relieved and put off to a greater degree, than if said notch connections were not employed, thereby prolonging the life of the reel. It is to be observed that by bowing or bending the bars 27 and 28, the walls of the notches 27ª and 28ª will bite against the adjacent bar. In other words, the notches become so narrowed by bending or bowing the bars 27 and 28, as to pinch or bind the adjacent bars, thereby insuring a very rigid and secure structure, as well as relieving the strain on the fastening means 26.

The invention having been set forth, what is claimed as new and useful is:—

1. In combination with a harvester reel, a support rigidly connected to the inner shoe of the guide bar of the sickle bar, and having a bearing, in which one end of a reel shaft is loosely mounted, the shoe at the outer end of the guide bar having a superimposed bearing member provided with a vertical slot through which the outer end of the reel shaft extends, and springs in said slot, one above and one below the shaft, thereby relieving the jar on the blades of the reel as they contact with the guide bar, incident to the oscillation of the reel shaft.

2. A revoluble member, comprising a shaft, two pairs of bowed bars adjacent each end of the shaft, the bars of one pair of each two pairs being disposed opposite each other flatwise and extending at right angles edgewise to the other adjacent pair, means for securing the bars to the shaft, the adjacent right angled extending edges of said bars of each two pair having registering interlocking notched connections, the opposite walls of the notches of which bite the adjacent bars incident to the bowing of said bars, thereby relieving the strain on said means and preventing looseness of play, thereby prolonging the life of the member, and elongated strips secured between the outer ends of said bowed bar.

In testimony whereof I have signed my name to this specification in the presence of two subscribing witnesses.

WILLIAM N. TERRY.

Witnesses:
 CLAUDE M. EWING,
 RAY D. WALKER.

Copies of this patent may be obtained for five cents each, by addressing the "Commissioner of Patents, Washington, D. C."